United States Patent
Al-Mojel et al.

(10) Patent No.: US 11,138,802 B1
(45) Date of Patent: Oct. 5, 2021

(54) GEO-AUGMENTED FIELD EXCURSION FOR GEOLOGICAL SITES

(71) Applicant: Saudi Arabian Oil Company, Dhahran (SA)

(72) Inventors: Abdullah Saad Al-Mojel, Dammam (SA); Maha Jaber Al-Dossary, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/841,188

(22) Filed: Apr. 6, 2020

(51) Int. Cl.
  *G06T 19/00* (2011.01)
  *G09B 23/40* (2006.01)
  *G01V 8/02* (2006.01)

(52) U.S. Cl.
  CPC ............ *G06T 19/006* (2013.01); *G09B 23/40* (2013.01); *G01V 8/02* (2013.01); *G06T 2219/004* (2013.01)

(58) Field of Classification Search
  None
  See application file for complete search history.

(56) References Cited

U.S. PATENT DOCUMENTS

| 8,199,166 | B2 * | 6/2012 | Repin | G06T 19/00 |
| | | | | 345/633 |
| 10,373,342 | B1 * | 8/2019 | Perez, III | G06T 7/97 |
| 2008/0071136 | A1 * | 3/2008 | Oohashi | A61M 21/02 |
| | | | | 600/27 |
| 2013/0278631 | A1 * | 10/2013 | Border | G02C 5/143 |
| | | | | 345/633 |
| 2014/0204121 | A1 | 7/2014 | Whitley et al. | |
| 2015/0077434 | A1 * | 3/2015 | Fukuchi | G06T 7/73 |
| | | | | 345/633 |

(Continued)

FOREIGN PATENT DOCUMENTS

| EP | 1157314 | 9/2004 |
| KR | 101591579 | 12/2013 |

OTHER PUBLICATIONS

Azuma et al., "Recent Advances in Augmented Reality," Survey, retrieved from URL <https://apps.dtic.mil/dtic/tr/fulltext/u2/a606245.pdf> retrieved on Mar. 9, 2020, published Nov./Dec. 2001, 15 pages.

(Continued)

*Primary Examiner* — Robert J Craddock
(74) *Attorney, Agent, or Firm* — Fish & Richardson P.C.

(57) ABSTRACT

Systems and methods include a computer-implemented method for annotating an augmented reality display. An indication that a user is present at a digital stop in a geographical region is received by an augmented reality (AR) device. 3D annotation information associated with a 3D location of the AR device in a 3D reconstructed map of the real world is received. A virtual reality display that overlays, in real-time, the 3D annotation information onto real-world objects in the geographical region is provided. A location of the AR device is determined and tracked using a six degrees-of-freedom localization system. A visual view of the AR device is associated with a pre-acquired 3D point-based model. Features of real-world objects are annotated. Simultaneous localization and mapping of the AR device and the visual view are performed to annotate 3D features during movement of the AR device. Features of the real-world objects are annotated.

17 Claims, 7 Drawing Sheets

(56) References Cited

U.S. PATENT DOCUMENTS

| | | | |
|---|---|---|---|
| 2016/0102528 A1* | 4/2016 | Wise | E21B 21/062 |
| | | | 166/336 |
| 2016/0306351 A1* | 10/2016 | Fisher | G05D 1/0016 |
| 2018/0286128 A1* | 10/2018 | Eade | G05D 1/0248 |

OTHER PUBLICATIONS

Lhuillier et al., "Surface reconstruction from a sparse point cloud by enforcing visibility consistency and topology constraints," HAL archives-ouvertes.fr, Jul. 17, 2019, 24 pages.

Newcombe and Davison, "Live Dense Reconstruction with a Single Moving Camera," 2010, 8 pages.

Whelan et al., "Robust Tracking for Real-Time Dense RGB-D Mapping with Kintinuous," MIT-CSAIL-TR-2012-031, Computer Science and Artificial Intelligence Laboratory Technical Report, Sep. 17, 2012, 10 pages.

Yousif et al., "An Overview to Visual Odometry and Visual SLAM: Applications to Mobile Robotics," Intell Ind Syst, 1:289-311, 2015, 23 pages.

\* cited by examiner

GEO-AUGMENTED FIELD EXCURSION FOR GEOLOGICAL SITES

BACKGROUND

The present disclosure applies to using augmented reality (AR) techniques to improve the process of excursions, such as geological excursions. In conventional processes, geologists typically prepare guidebooks that can be used during field excursions and geological surveys performed by human explorers at specific geological sites. The human explorers can include, for example, geologists, petroleum engineers, and other people associated with projects that occur at the specific sites. The guidebooks can include, for example, detailed descriptions of rock units (or rock formations) that may be supplemented by outcrop photographs. The guidebooks can also include log sections that may be captioned with X/Y coordinates for use as a spatial reference. Descriptions of the rock units can include, for example, color, thickness, and physical sedimentological structures. However, guidebooks may typically have limitations, for example, of not providing information associated with variations of information along the Z axis. As a result, the human explorers do not have easy and automatic access to geological data that can be presented simultaneously in the field and associated with what the human explorers see.

Digging and fetching surface geological data and displaying the information alongside actual outcrops that are viewed can be difficult and time-consuming. Using a conventional guidebook alone in the field can have limitations. Moreover, comparing a written description with a real-world view (for example, what the expert visually sees) is not straightforward or efficient. Further, non-trained users typically have difficulty in identifying geological formations, or rock units, on their own.

SUMMARY

The present disclosure describes techniques that can be used to provide augmented reality (AR) displays that improve the process of field excursion. For example, human explorers can have access to geological data that is presented simultaneously in the field and associated with what the human explorers see. AR displays can provide a three-dimensional visual tool that enhances users' perception and insight of geological sites.

Geological field excursions can be improved by providing AR technology for projecting, in real time, virtual geological information and interpretation side-by-side with views of physical outcrops. In some implementations, an automated and accurate presentation of geological information in the field can facilitate further geological studies, offer efficient knowledge-sharing with trainees, and provide effective guidance for geo-tourists or hikers in an unfamiliar new site. The techniques can also be applied to any geological application in field study or training as an example of geological discipline in areas of sedimentary and stratigraphy.

Traditionally (in conventional systems, for example), stratigraphic information is displayed in either a geographic map with spatial components (X/Y-axes) and a vertical component (Z-axis) in a log profile. The only way to use this information in the field is through the geographic information (X/Y axes) with the guidance of the global positioning system (GPS) capabilities. These conventional techniques can have major limitations because most of the stratigraphic information and detail variation are in a vertical (Z axis) log profile that has no way to project and apply their information in the field without a human guidance (for example, by a stratigraphic log generator). The cost of human experts to convey detailed knowledge onsite at all times is extremely high and may be impractical or unavailable in many cases. As a result, a need exists for a smart function that integrates and overlays geological aspects in the field, in real time and using different orientations and scales. The term "real time" can correspond to events that occur within a specified period of time, for example, within a few minutes or a few seconds. Techniques of the present disclosure can provide a new paradigm to the field study experience by equipping a field geologist, for example, with a different lens of view to look over geological sites while having geological data augmented on their field-of-view.

In some implementations, a computer-implemented method includes the following. Three-dimensional (3D) annotation information associated with a geographical region is received by an augmented reality (AR) device from a central repository. An indication that a user is at a digital stop in the geographical region is received by the AR device. A virtual reality display is provided for presentation to the user by the AR device in response to receiving the indication. The virtual reality display overlays, in real-time, the 3D annotation information onto real-world objects in the geographical region. A location of the user is determined. A direction of sight of the AR device is determined. An indication that a user is present at a digital stop in a geographical region is received by an augmented reality (AR) device. 3D annotation information associated with a 3D location of the AR device in a 3D reconstructed map of the real world is received by the AR device from a central repository. A virtual reality display that overlays, in real-time, the 3D annotation information onto real-world objects in the geographical region is provided for presentation to the user by the AR device in response to receiving the indication. A location of the AR device is determined and tracked using a six-degrees-of-freedom (6-DOF) localization system. A visual view of the AR device is associated with a pre-acquired 3D point-based model of a same environment. Features of real-world objects are annotated using the 3D annotation information. Simultaneous localization and mapping of the AR device and the visual view are performed to annotate 3D features during movement of the AR device. Features of the real-world objects are annotated using the 3D annotation information.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, decision-making or conducting new analysis can be enhanced by having all surface geological data in-hand and displayed in an accurate way. Second, the techniques can provide an efficient way of transferring knowledge from a field expert (or geologist) to a learner. Third, the techniques can provide effective ways of recording and displaying surface geological exploration studies. Fourth, Simultaneous Localization and Mapping (SLAM) and AR technologies can be used in acquiring and displaying surface geological data and interpretation. Fifth, new interpretation and discovery by experts in the office can be used to update a central system and relayed to field users in real time, providing an advantage over static and frequently outdated information provided by conventional techniques. Sixth, integration of sedimentological and stratigraphical interpretation can be provided in an AR environment. Seventh, providing AR overlays can simplify geologists' physical maneuvering in harsh field environments. Eighth, having all surface geological data in-hand and displayed in an accurate place can provide value for decision-making or conducting new analysis.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for providing augmented reality (AR) displays that improve the process of field excursion, including by field geologists at geological sites. For example, the techniques can support methodologies and workflows for using AR displays during geological excursions. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques provide an efficient way of transferring knowledge from field expert to learner. The techniques also provide an effective method of recording and displaying surface geological exploration studies.

A challenge can exist in how to organize, integrate, and convey the visual information of the field to others in its proper context. In conventional systems, geologists can prepare a guidebook that includes a detailed description of rock units supplemented by outcrop photographs and log sections that are usually captioned by X/Y coordinates as a spatial reference. The description of the rock units can include, for example, color, thickness, and physical sedimentological structures. However, using a guidebook alone in the field does not help the reader, and comparing the written description with the reality is not a straightforward task. Users usually find it difficult to directly identify the rock units on their own using only the guidebook. Therefore, field experts frequently have to accompany and guide others to show the variation of information along the Z axis. This practice can be very costly and in many occasions is not practical or feasible. Therefore, a need exists to have access to the geological data simultaneously in the field in a three-dimensional way to enhance a user's perception and insight of geological sites.

AR is an environment that allows users to see the real world with interactive information that is injected into a digital display. AR enables users to interact with and see the physical world around them. This is different from virtual environment (VE) technologies that places a user in a total virtual scene.

Stratigraphy studies deal with stratified sedimentary rocks that are composed of several types of information. For example, the information can be associated with mineralogy, lithology, sedimentary structure, bedding contact, grain types, grain size, and fossils. Much of this type of information can be observed and described directly in the field, while some of this type of information can require a laboratory preparation and detailed microscopic analyses. Observations that are made in the field by geologists can be coupled with geological interpretation that includes, for example, depositional environment, age, unconformity, and system tracts.

Figure 1:
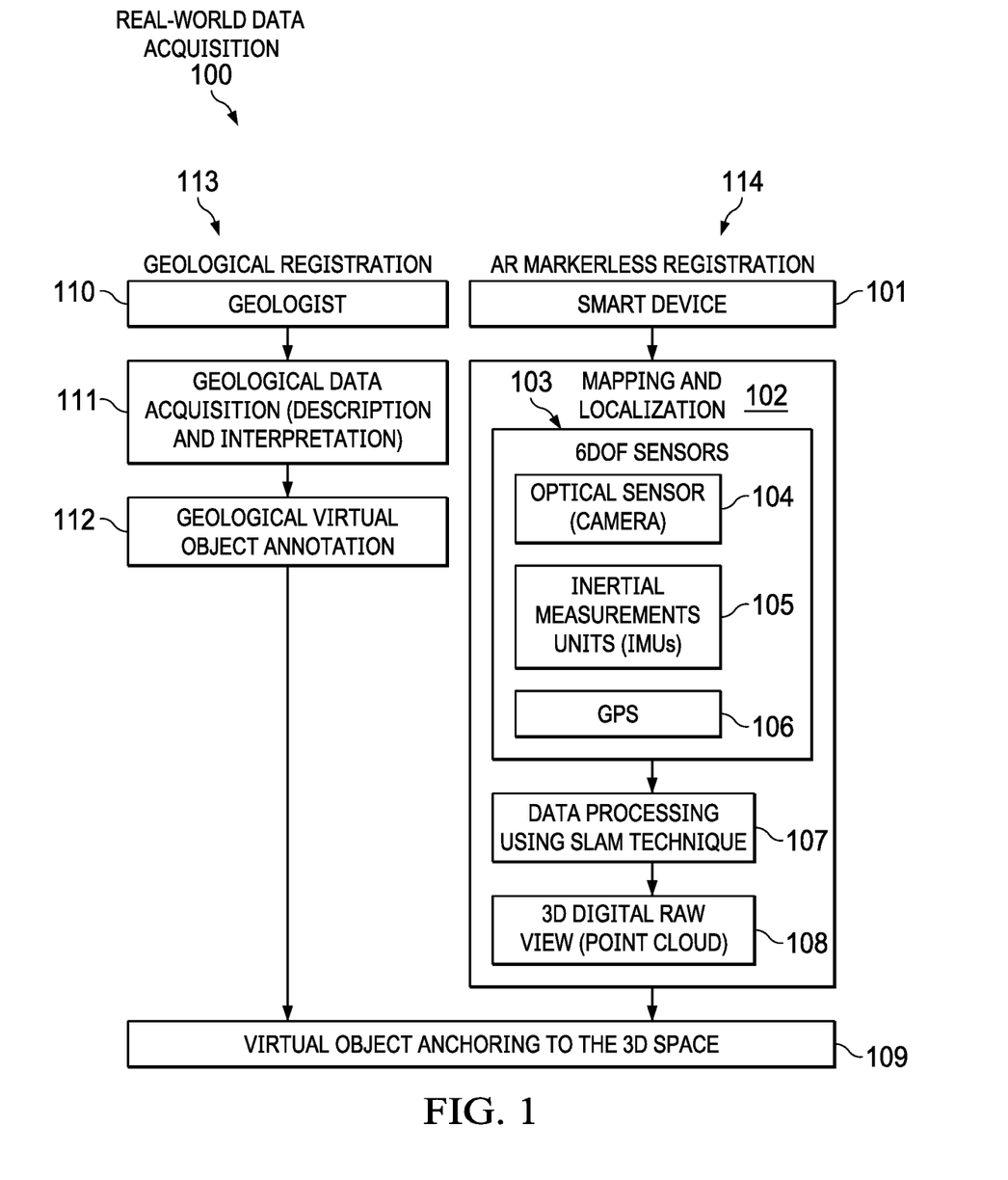
FIG. 1 is a block diagram showing components of a real-world data acquisition system, according to some implementations of the present disclosure.

FIG. 1 is a block diagram showing components of a real-world data acquisition system 100, according to some implementations of the present disclosure. Components of the real-world data acquisition system 100 can include people, devices, tasks, processes, and computer-implemented processing and displays, for example. The components of the real-world data acquisition 100 can be categorized as (or grouped by) geological registration components 113 and AR markerless registration components 114.

During a field data acquisition stage, at least one geologist 110 (for example, a stratigrapher) can observe vertical changes (including visually different distinguishable features) of the strata. During a geological data acquisition stage 111, observations can be described and interpreted, and the information can be recorded. In some implementations, the information can be recorded in a log sheet in a vertical dimension (or Z-axis dimension) that is represented, for example, by a thickness with a scale of around 1:120 to 1:200. During this vertical data acquisition, stratigraphers can navigate laterally in the field (for example, in 25-hectare areas) to gather and capture as much data as possible. The data may be scattered in the field along three-dimensional axes (X, Y, and Z). AR pre-processing techniques can be used in a geological virtual object annotation stage 112 to prepare the information for presentation in AR systems. The AR pre-processing techniques can be used to supplement information from the physical geological sites with virtual geological information that can be used to augment a user's line of vision during a geological excursion. In this way, the virtual objects can be placed and represented in a three-dimensional referenced system to support an interactive display in real time. The virtual objects can include displayable features such as text, lines, tables, graphs, image overlays, audio recordings, and complex animated three-dimensional (3D) models.

Different types of AR devices that are used for combining real and virtual elements can include, for example, head-worn display (HWD) systems, head-mounted display (HMD) systems, heads-up display (HUD) systems, and hand-held displays. In an example, a smart device 101 can be a hand-held display such as a smart phone, a tablet, or other computerized device.

A smart phone running an application can be used to operate an AR system instead of using an expensive and complex AR device. Smart devices 101 continue to become more and more portable. However, dedicated and hands-free AR devices can also be used and may allow a user to walk safely around a geological site that may have a rough terrain requiring more caution.

A mapping and localization system 102 provided by the smart device 101 can provide positioning and mapping information. The mapping and localization system 102 can use the user's location derived or determined using computational techniques such as Simultaneous Localization and Mapping (SLAM) techniques 107. The SLAM techniques 107 can process inputs received from sensors, including six-degrees-of-freedom (6DOF) sensors. The sensors can include built-in sensors of the smart device 101 including, for example, optical sensors 104 (cameras), Inertial Measurements Units (IMUs) 105, and global positioning system (GPS) 106 capabilities.

Information obtained from sensors by the mapping and localization system 102 can support a 3D digital raw view 108 (or point cloud). The view can represent a point-based 3D model of physical objects (for example, geological outcrops). The view can be built using SLAM processes and can be updated in real time. For example, real-time updates can occur while simultaneously keeping track of the device's position and orientation with respect to the 3D mapping. This can result in having distinctive features mapped as points in one image frame that is matched to other scenery images of the same environment.

A 3D point cloud model can use triangulation and other techniques to provide an accurate measurement of objects' dimensions and distances. An object (and its measurements) can be considered as an anchoring reference and basis for an AR registration and displaying process. The point cloud used by the 3D point cloud model can provide an accurate measurement of the object's dimension and distances. This can allow users to navigate within the environment without using AR markers, making the AR process markerless. The built-in GPS 106 in the smart device 101 can guide a user to locations (X/Y axes) of controlled AR environments having prior information and registration.

Figure 2:
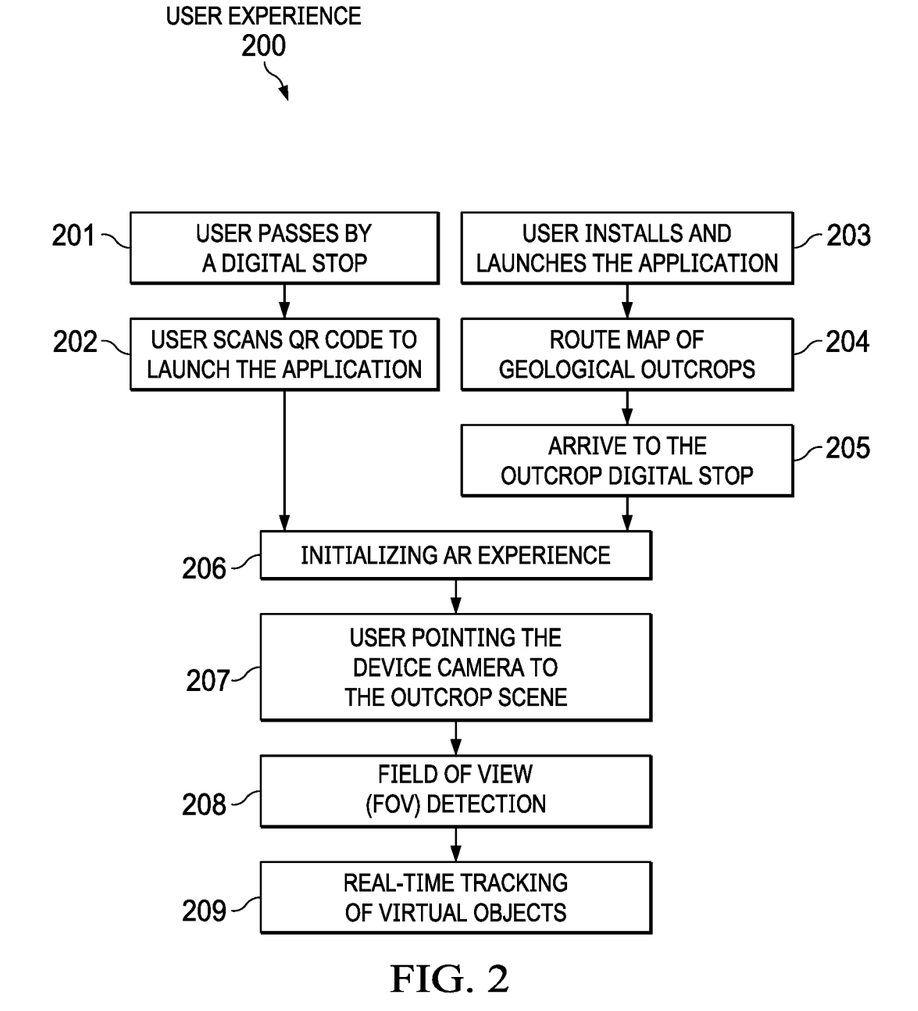
FIG. 2 is a block diagram showing an example of a workflow for a user experience process, according to some implementations of the present disclosure.

FIG. 2 is a block diagram showing an example of a workflow for a user experience process 200, according to some implementations of the present disclosure. Users can have at least two options for interacting with augmented geological sites. For example, at 201, users can pass by a digital stop that is automatically detected by a smart device. In some implementations, the smart device can provide a notification that a user is at or near a digital stop (or the direction to travel to arrive at the digital stop). In another example, at 202, users can scan a quick response (QR) code available at various locations. In some implementations, the action of the user passing by digital stops that are established registered AR sites can automatically initiate a preloaded toolkit.

In some implementations, at 203, the user can install and launch a tool kit (which can optionally be pre-loaded on the smart device 101). At 204, the smart device 101 can provide the user with a route map and locations of AR digital stops. At 205, when the user arrives at a digital stop, the user simply needs to arrive at the digital stop which is detected by the smart device 101.

At 206, upon arrival detection of the user arriving at a digital stop, the smart device 101 can initiate the AR experience. Initiation can include the use of GPS capabilities and activation of the camera. At 207, the smart device 101 can ask (or prompt) the user to point the camera of the device at an outcrop scene (See FIG. 6). At 208, the device can perform field-of-view (FOV) detection, for example, with the control of 6DOF sensors 103 (See FIG. 1) and motional photogrammetry, for example, using structure from motion (SFM) techniques. Users can then track the virtual geological information and can interact with and receive real-time feedbacks 209 (See FIG. 7).

Figure 3:
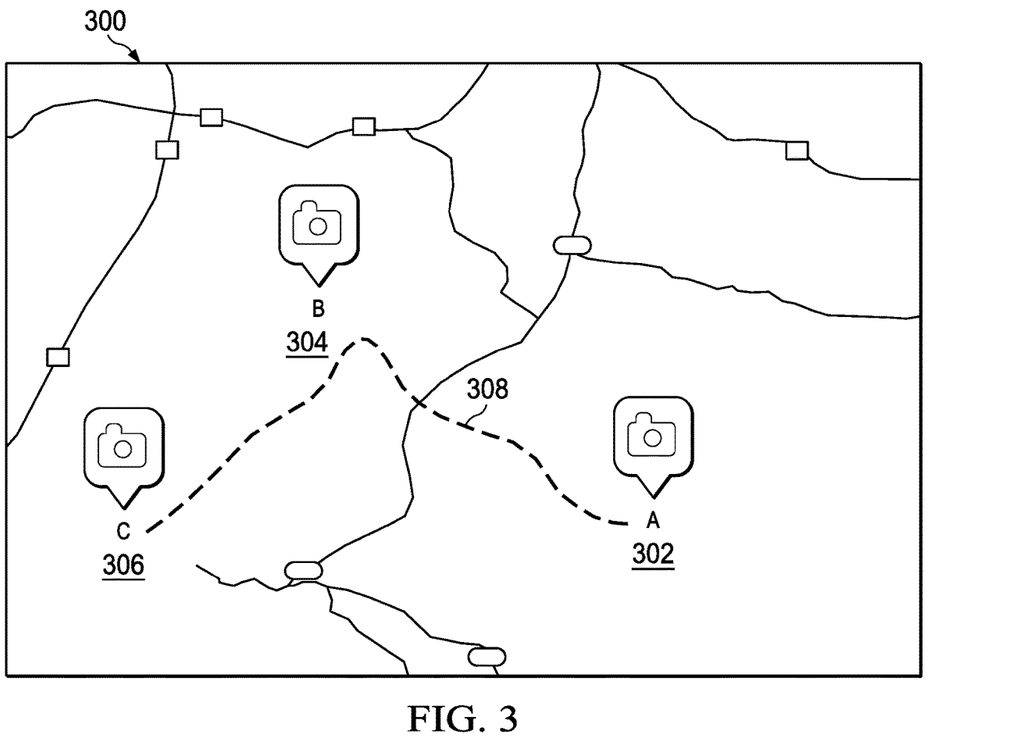
FIG. 3 is a map showing digital stops at locations, according to some implementations of the present disclosure.

FIG. 3 is a map 300 showing digital stops at locations 302, 304, and 306, according to some implementations of the present disclosure. A user walking a path 308 can encounter the digital stops at the locations 302, 304, and 306 during a geological survey, for example. The digital stops can display a QR code that is scannable by users using their smart devices 101.

Figure 4:
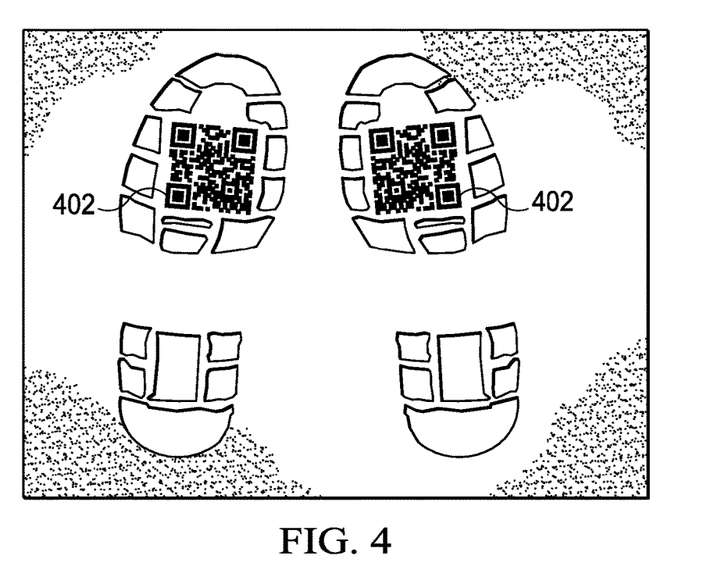
FIGS. 4 and 5 show examples of established registered geological sites, according to some implementations of the present disclosure.
Figure 5:
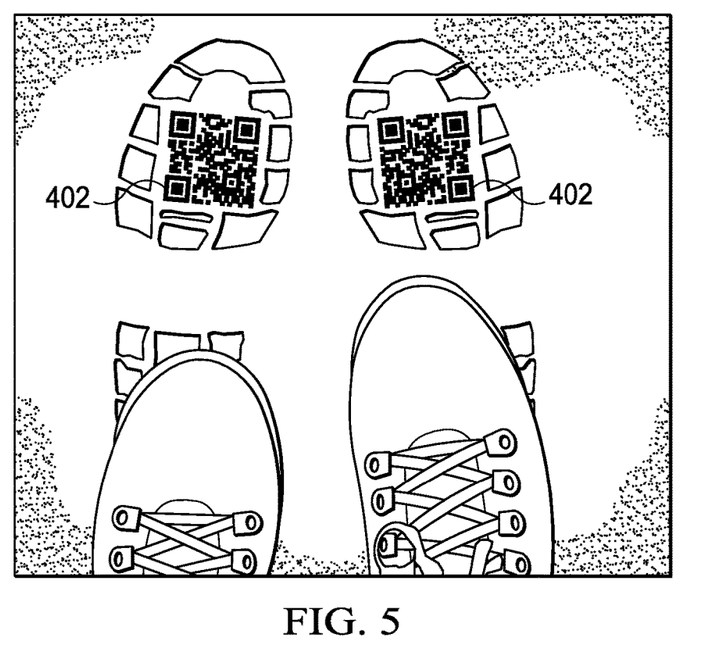

FIGS. 4 and 5 show examples of established registered geological sites, according to some implementations of the present disclosure. FIG. 5 shows QR codes 402 affixed to an established registered AR site. The QR codes 402 can be scanned by the user when the user arrives at the site. The scanning can initiate an AR session. In some implementations, the QR code 402 can be painted onto a surface at a registered geological site, such as onto the surface of a rock. In some implementations, the QR code 402 can be pre-printed and carried to (and installed at) the registered geological site. After the QR code 402 is painted or installed, the geological site can be registered, including capturing and recording the GPS location of the geological site.

In general, GPS alone is not accurate enough to guide the user within the controlled registered environments (for example, location 302). Therefore, the camera and the IMUS can fill the gap in positioning by providing a freedom of movement in six dimensions or degrees of freedom. The six dimensions can include linear movements and turning and tilting motions along the 3D axes (X, Y and Z). The linear movements can include: forward and backward (surge, or X-axis) movements, left and right (sway, or Y-axis) movements, and up-and-down (heave, or Z-axis) movements. The angular tilting and turning motions can include: side-to-side (roll, X-axis) motions, forward and backward (pitch, Y-axis) motions, and left and right (yaw, Z-axis) motions. The turning motion can be controlled by IMU systems equipped with a variety of gyroscopes and accelerometers. Once the point cloud is constructed, geologist can anchor the geological virtual objects that can be cloaked around the mesh, resulting in a digital raw view of a 3D geological and geomorphological model 109. The virtual geological digital information can be blended with the physical world using a toolkit designed and installed in the smart device 101.

Figure 6:
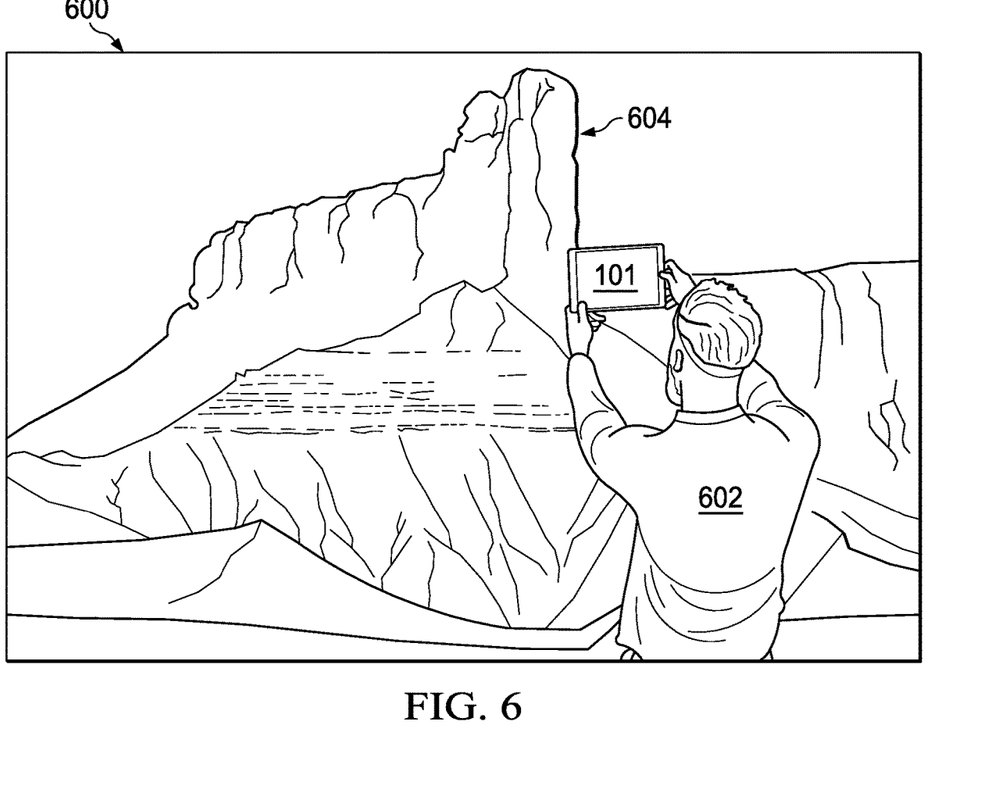
FIG. 6 is a diagram showing an example of a view in which a user is pointing a smart device at an outcrop, according to some implementations of the present disclosure.

FIG. 6 is a diagram showing an example of a view 600 in which a user 602 is pointing a smart device at a physical outcrop 604, according to some implementations of the present disclosure. The user 602 may be standing at or near one of the locations 302, 304, and 306, using the smart device 101 to provide AR displays for outcrops in the area.

Figure 7:
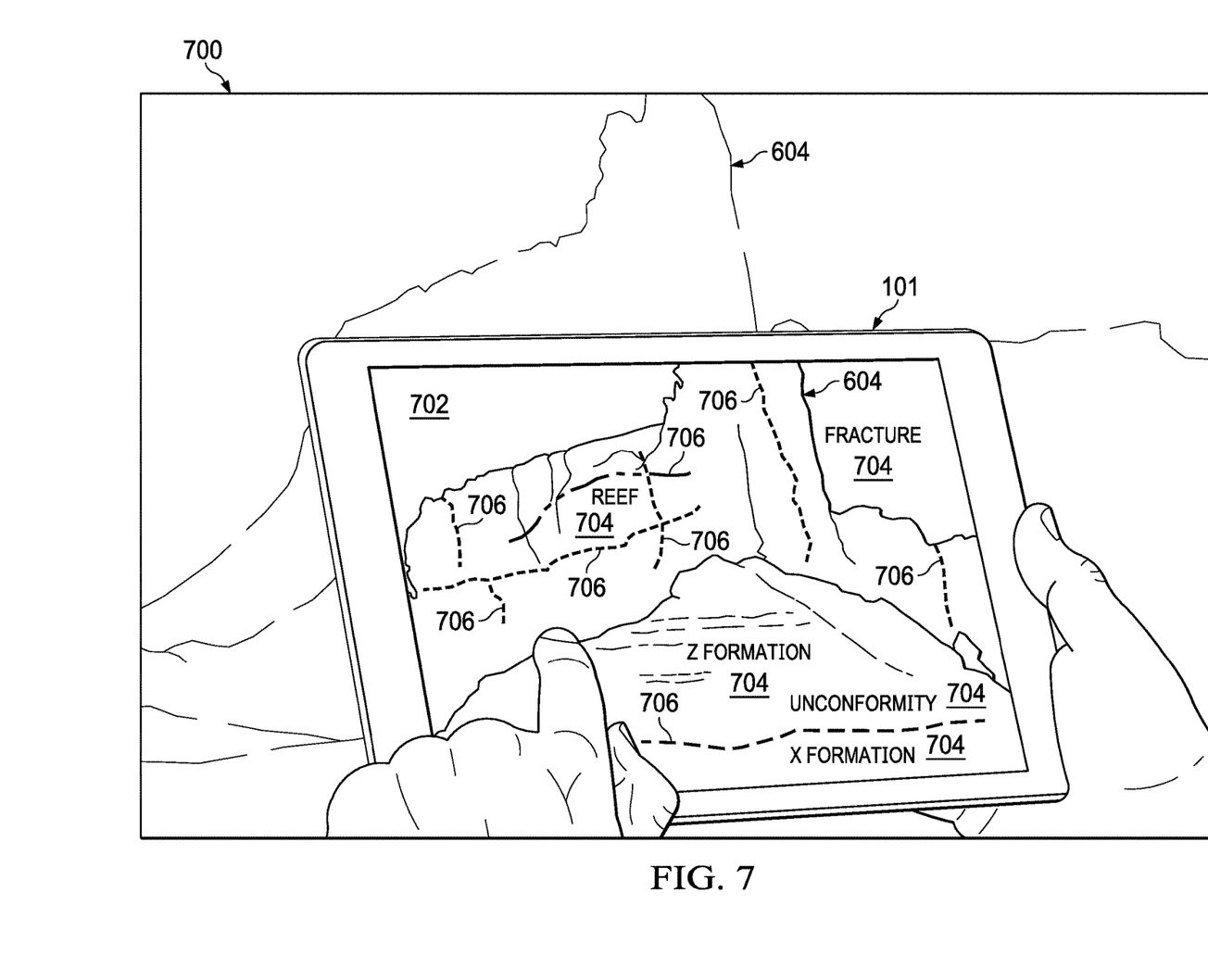
FIG. 7 is a diagram showing an example of a view during use of an augmented reality system, according to some implementations of the present disclosure.

FIG. 7 is a diagram showing an example of a view 700 during use of an augmented reality system, according to some implementations of the present disclosure. During a geological survey, the augmented reality system can provide real-time virtual geological information and interpretation that is projected side-by-side with views of objects (for example, the physical outcrop 604). The view 700 depicts a screen 702 on the smart device 101 (for example, a tablet computer) displaying a user interface that includes an AR display. The AR display includes labels 704 and line markings 706. In some implementations, user selection of a label or marking can trigger the display of additional information regarding an object on the screen 702, such as to provide a drill-down effect.

Figure 8:
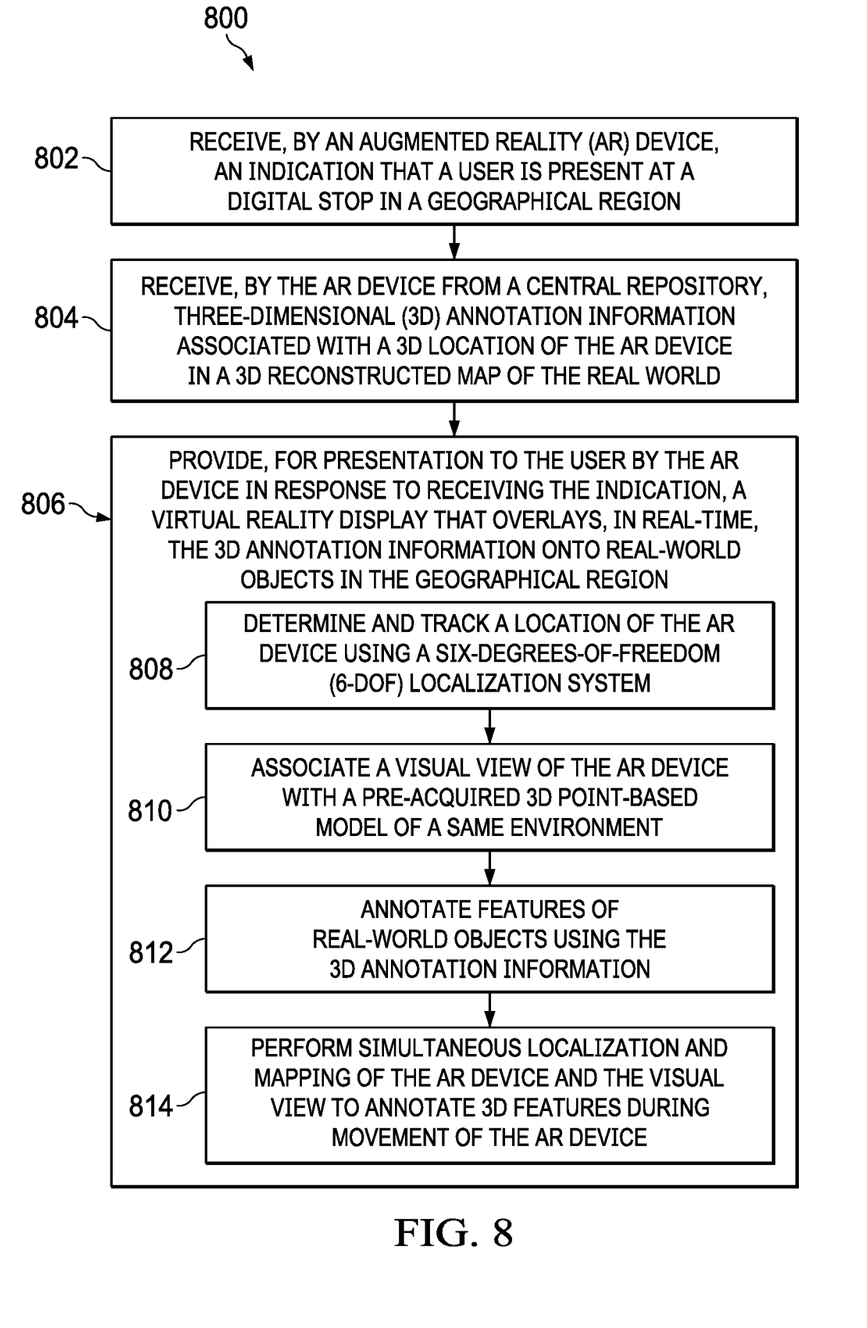
FIG. 8 is a flowchart of an example of a method for using an augmented reality system for overlaying information regarding objects in a direction of sight, according to some implementations of the present disclosure.

FIG. 8 is a flowchart of an example of a method 800 for using an augmented reality system for overlaying information regarding objects in a direction of sight, according to some implementations of the present disclosure. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order.

At 802, an indication that a user is present at a digital stop in a geographical region is received by an augmented reality (AR) device. As an example, the user can scan a QR code at one of the locations 302, 304, and 306. From 802, method 800 proceeds to 804.

At 804, three-dimensional (3D) annotation information associated with a 3D location of the AR device in a 3D reconstructed map of the real world is received by the AR device from a central repository. For example, the smart device 101 can receive information that was generated by a geologist 110 through the geologist's description and interpretation of geological outcrops in an area. The 3D annotation information can include, for example, 3D geological information of outcrops in the geographical region provided by geologists and stored at the central repository. The 3D annotation information can be based on geological interpretation that includes depositional environment, age, unconformity, and system tracts. The AR device can be a head-worn display (HWD) system, a head-mounted display (HMD) system, a heads-up display (HUD) system, or hand-held displays (for example, an application running on a smart phone). From 804, method 800 proceeds to 806.

At 806, a virtual reality display is provided for presentation to the user by the AR device in response to receiving the indication. The virtual reality display overlays, in real-time, the 3D annotation information onto real-world objects in the geographical region. Annotating the features can include displaying text, lines, tables, graphs, image overlays, audio recordings, and complex animated 3D models associated with the real-world objects. Providing the 3D annotation information can include automatically updating virtual reality display relative to the geographical region and direction of sight based on angular tilting and turning motions of the AR device including: 1) side-to-side (or roll, X-axis motions); 2) forward and backward (or pitch, Y-axis motions); and 3) left and right (or yaw, Z-axis motions). Providing the 3D annotation information can include using the mapping and localization system 102 to determine the location of the user. Determining the location of the user can include using Simultaneous Localization and Mapping (SLAM) techniques to process inputs received from sensors optical sensors, Inertial Measurements Units (IMUs), and global positioning system (GPS) capabilities.

In an example, SLAM techniques can be used to map the environment (for example, the outcrop) and localize the device within the environment using device camera streaming (for example, using successive camera frames or a sequence of images). Visual SLAM is computationally-intensive process and time-consuming to be considered alone. A technique called sensor fusion that includes GPS & IMU can be used to construct the 3D map (using a point cloud). The technique can reduce virtual objects drifting and can provide a better understanding of the environment, allowing the device to more effectively map and adjust to changes. 3D annotation information (or what can be called the virtual object to be projected) is not only associated with a geographic location but it includes as well its 3D location in the 3D reconstructed map of the real world. As the user works with the AR system, an automated process runs in the background to recognize the live scene map in a camera view (real world) with its counterpart map in the database (pre-acquired). Once the maps are getting matched, any pre-anchored virtual objects will be displayed in the screen in the right position. In some implementations, providing the virtual reality display can include sub-steps 808, 810, 812, and 814.

At 808, a location of the AR device is determined and tracked using a six-degrees-of-freedom (6-DOF) localization system. For example, the smart device 101 can use 6-DOF capabilities and GPS to determine the user's current location. From 808, method 800 proceeds to 810.

At 810, a visual view of the AR device is associated with a pre-acquired 3D point-based model of a same environment. As an example, features of the smart device 101, including gyroscopes and accelerometers, can determine where cameras of the smart device 101 are pointed and create a corresponding view. This can occur in real time regardless of linear movements and turning and tilting motions along the 3D axes (X, Y and Z). From 810, method 800 proceeds to 812.

At 812, features of real-world objects are annotated using the 3D annotation information. For example, the mapping and localization system 102 can be used to identify and annotate specific objects in the camera(s)' line of site. From 812, method 800 proceeds to 814.

At 814, simultaneous localization and mapping of the AR device and the visual view are performed to annotate 3D features during movement of the AR device. As an example, the AR display can be updated to include labels 704 and line markings 706. After sub-step 814 of step 806, method 800 can stop.

Figure 9:
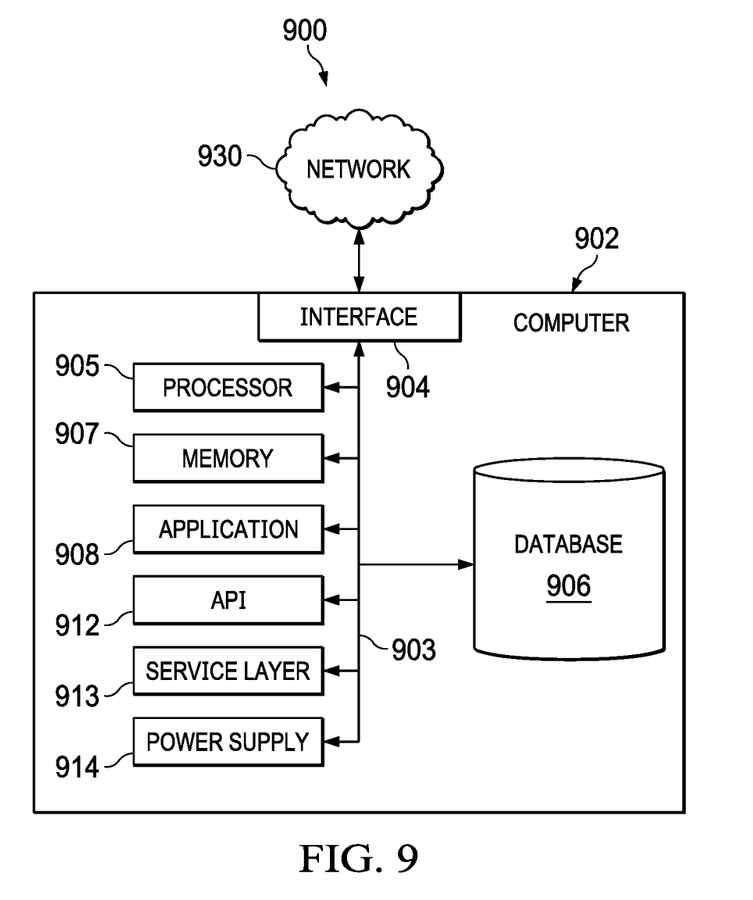
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a top level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method includes the following. An indication that a user is present at a digital stop in a geographical region is received by an augmented reality (AR) device. 3D annotation information associated with a 3D location of the AR device in a 3D reconstructed map of the real world is received by the AR device from a central repository. A virtual reality display that overlays, in real-time, the 3D annotation information onto real-world objects in the geographical region is provided for presentation to the user by the AR device in response to receiving the indication. A location of the AR device is determined and tracked using a six-degrees-of-freedom (6-DOF) localization system. A visual view of the AR device is associated with a pre-acquired 3D point-based model of a same environment. Features of real-world objects are annotated using the 3D annotation information. Simultaneous localization and mapping of the AR device and the visual view are performed to annotate 3D features during movement of the AR device. Features of the real-world objects are annotated using the 3D annotation information. The foregoing and other described implementations can each, optionally, include one or more of the following features:

A first feature, combinable with any of the following features, where the 3D annotation information is 3D geological information of outcrops in the geographical region, and where the 3D geological information of the outcrops is provided by geologists and stored at the central repository.

A second feature, combinable with any of the previous or following features, where the 3D annotation information is based on geological interpretation that includes depositional environment, age, unconformity, and system tracts.

A third feature, combinable with any of the previous or following features, where annotating the features includes displaying text, lines, tables, graphs, image overlays, audio recordings, and complex animated 3D models associated with the real-world objects.

A fourth feature, combinable with any of the previous or following features, where providing the 3D annotation information includes automatically updating virtual reality display relative to the geographical region and direction of sight based on angular tilting and turning motions of the AR device including: side-to-side, roll, X-axis motions; forward and backward, pitch, Y-axis motions; and left and right, yaw, Z-axis motions.

A fifth feature, combinable with any of the previous or following features, where the AR device is selected from a group comprising head-worn display (HWD) systems, head-mounted display (HMD) systems, heads-up display (HUD) systems, and hand-held displays.

A sixth feature, combinable with any of the previous or following features, where providing the 3D annotation information includes using a mapping and localization system to determine the location of the user.

A seventh feature, combinable with any of the previous or following features, where determining and tracking the location of the AR device includes using Simultaneous Localization and Mapping (SLAM) techniques to process inputs received from sensors optical sensors, Inertial Measurements Units (IMUs), and global positioning system (GPS) capabilities.

In a second implementation, a non-transitory, computer-readable medium stores one or more instructions executable by a computer system to perform operations including the following. An indication that a user is present at a digital stop in a geographical region is received by an augmented reality (AR) device. 3D annotation information associated with a 3D location of the AR device in a 3D reconstructed map of the real world is received by the AR device from a central repository. A virtual reality display that overlays, in real-time, the 3D annotation information onto real-world objects in the geographical region is provided for presentation to the user by the AR device in response to receiving the indication. A location of the AR device is determined and tracked using a six-degrees-of-freedom (6-DOF) localization system. A visual view of the AR device is associated with a pre-acquired 3D point-based model of a same environment. Features of real-world objects are annotated using the 3D annotation information. Simultaneous localization and mapping of the AR device and the visual view are performed to annotate 3D features during movement of the AR device. Features of the real-world objects are annotated using the 3D annotation information.

The foregoing and other described implementations can each, optionally, include one or more of the following features:

A first feature, combinable with any of the following features, where the 3D annotation information is 3D geological information of outcrops in the geographical region, and where the 3D geological information of the outcrops is provided by geologists and stored at the central repository.

A second feature, combinable with any of the previous or following features, where the 3D annotation information is based on geological interpretation that includes depositional environment, age, unconformity, and system tracts.

A third feature, combinable with any of the previous or following features, where annotating the features includes displaying text, lines, tables, graphs, image overlays, audio recordings, and complex animated 3D models associated with the real-world objects.

A fourth feature, combinable with any of the previous or following features, where providing the 3D annotation information includes automatically updating virtual reality display relative to the geographical region and direction of sight based on angular tilting and turning motions of the AR device including: side-to-side, roll, X-axis motions; forward and backward, pitch, Y-axis motions; and left and right, yaw, Z-axis motions.

A fifth feature, combinable with any of the previous or following features, where the AR device is selected from a group comprising head-worn display (HWD) systems, head-mounted display (HMD) systems, heads-up display (HUD) systems, and hand-held displays.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. An indication that a user is present at a digital stop in a geographical region is received by an augmented reality (AR) device. 3D annotation information associated with a 3D location of the AR device in a 3D reconstructed map of the real world is received by the AR device from a central repository. A virtual reality display that overlays, in real-time, the 3D annotation information onto real-world objects in the geographical region is provided for presentation to the user by the AR device in response to receiving the indication. A location of the AR device is determined and tracked using a six-degrees-of-freedom (6-DOF) localization system. A visual view of the AR device is associated with a pre-acquired 3D point-based model of a same environment. Features of real-world objects are annotated using the 3D annotation information. Simultaneous localization and mapping of the AR device and the visual view are performed to annotate 3D features during movement of the AR device. Features of the real-world objects are annotated using the 3D annotation information.

The foregoing and other described implementations can each, optionally, include one or more of the following features:

A first feature, combinable with any of the following features, where the 3D annotation information is 3D geological information of outcrops in the geographical region, and where the 3D geological information of the outcrops is provided by geologists and stored at the central repository.

A second feature, combinable with any of the previous or following features, where the 3D annotation information is based on geological interpretation that includes depositional environment, age, unconformity, and system tracts.

A third feature, combinable with any of the previous or following features, where annotating the features includes displaying text, lines, tables, graphs, image overlays, audio recordings, and complex animated 3D models associated with the real-world objects.

A fourth feature, combinable with any of the previous or following features, where providing the 3D annotation information includes automatically updating virtual reality display relative to the geographical region and direction of sight based on angular tilting and turning motions of the AR device including: side-to-side, roll, X-axis motions; forward and backward, pitch, Y-axis motions; and left and right, yaw, Z-axis motions.

A fifth feature, combinable with any of the previous or following features, where the AR device is selected from a group comprising head-worn display (HWD) systems, head-mounted display (HMD) systems, heads-up display (HUD) systems, and hand-held displays.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
  receiving, by an augmented reality (AR) device, an indication that a user is present at a digital stop in a geographical region;
  receiving, by the AR device from a central repository, three-dimensional (3D) annotation information associated with a 3D location of the AR device in a 3D reconstructed map of the real world, wherein the 3D annotation information is 3D geological information of outcrops in the geographical region, and wherein the 3D geological information of the outcrops is provided by geologists and stored at the central repository; and
  providing, for presentation to the user by the AR device in response to receiving the indication, a virtual reality display that overlays, in real-time, the 3D annotation information onto real-world objects in the geographical region, including:
    determining and tracking a location of the AR device using a six-degrees-of-freedom (6-DOF) localization system;
    associating a visual view of the AR device with a pre-acquired 3D point-based model of a same environment;
    annotating features of real-world objects using the 3D annotation information; and
    performing simultaneous localization and mapping of the AR device and the visual view to annotate 3D features during movement of the AR device.

2. The computer-implemented method of claim 1, wherein the 3D annotation information is based on geological interpretation that includes depositional environment, age, unconformity, and system tracts.

3. The computer-implemented method of claim 1, wherein annotating the features includes displaying text, lines, tables, graphs, image overlays, audio recordings, and complex animated 3D models associated with the real-world objects.

4. The computer-implemented method of claim 1, wherein providing the 3D annotation information includes automatically updating virtual reality display relative to the geographical region and direction of sight based on angular tilting and turning motions of the AR device including:
  side-to-side, roll, X-axis motions;
  forward and backward, pitch, Y-axis motions; and
  left and right, yaw, Z-axis motions.

5. The computer-implemented method of claim 1, wherein the AR device is selected from a group comprising head-worn display (HWD) systems, head-mounted display (HMD) systems, heads-up display (HUD) systems, and hand-held displays.

6. The computer-implemented method of claim 1, wherein providing the 3D annotation information includes using a mapping and localization system to determine the location of the user.

7. The computer-implemented method of claim 6, wherein determining and tracking the location of the AR device includes using Simultaneous Localization and Mapping (SLAM) techniques to process inputs received from sensors optical sensors, Inertial Measurements Units (IMUs), and global positioning system (GPS) capabilities.

8. A non-transitory, computer-readable medium storing one or more instructions executable by a computer system to perform operations comprising:
  receiving, by an augmented reality (AR) device, an indication that a user is present at a digital stop in a geographical region;
  receiving, by the AR device from a central repository, three-dimensional (3D) annotation information associated with a 3D location of the AR device in a 3D reconstructed map of the real world, wherein the 3D annotation information is 3D geological information of outcrops in the geographical region, and wherein the 3D geological information of the outcrops is provided by geologists and stored at the central repository; and
  providing, for presentation to the user by the AR device in response to receiving the indication, a virtual reality display that overlays, in real-time, the 3D annotation information onto real-world objects in the geographical region, including:

determining and tracking a location of the AR device using a six-degrees-of-freedom (6-DOF) localization system;

associating a visual view of the AR device with a pre-acquired 3D point-based model of a same environment;

annotating features of real-world objects using the 3D annotation information; and performing simultaneous localization and mapping of the AR device and the visual view to annotate 3D features during movement of the AR device.

9. The non-transitory, computer-readable medium of claim 8, wherein the 3D annotation information is based on geological interpretation that includes depositional environment, age, unconformity, and system tracts.

10. The non-transitory, computer-readable medium of claim 8, wherein annotating the features includes displaying text, lines, tables, graphs, image overlays, audio recordings, and complex animated 3D models associated with the real-world objects.

11. The non-transitory, computer-readable medium of claim 8, wherein providing the 3D annotation information includes automatically updating virtual reality display relative to the geographical region and direction of sight based on angular tilting and turning motions of the AR device including:

side-to-side, roll, X-axis motions;

forward and backward, pitch, Y-axis motions; and left and right, yaw, Z-axis motions.

12. The non-transitory, computer-readable medium of claim 8, wherein the AR device is selected from a group comprising head-worn display (HWD) systems, head-mounted display (HMD) systems, heads-up display (HUD) systems, and hand-held displays.

13. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

receiving, by an augmented reality (AR) device, an indication that a user is present at a digital stop in a geographical region;

receiving, by the AR device from a central repository, three-dimensional (3D) annotation information associated with a 3D location of the AR device in a 3D reconstructed map of the real world, wherein the 3D annotation information is 3D geological information of outcrops in the geographical region, and wherein the 3D geological information of the outcrops is provided by geologists and stored at the central repository; and providing, for presentation to the user by the AR device in response to receiving the indication, a virtual reality display that overlays, in real-time, the 3D annotation information onto real-world objects in the geographical region, including:

determining and tracking a location of the AR device using a six-degrees-of-freedom (6-DOF) localization system;

associating a visual view of the AR device with a pre-acquired 3D point-based model of a same environment;

annotating features of real-world objects using the 3D annotation information; and performing simultaneous localization and mapping of the AR device and the visual view to annotate 3D features during movement of the AR device.

14. The computer-implemented system of claim 13, wherein the 3D annotation information is based on geological interpretation that includes depositional environment, age, unconformity, and system tracts.

15. The computer-implemented system of claim 13, wherein annotating the features includes displaying text, lines, tables, graphs, image overlays, audio recordings, and complex animated 3D models associated with the real-world objects.

16. The computer-implemented system of claim 13, wherein providing the 3D annotation information includes automatically updating virtual reality display relative to the geographical region and direction of sight based on angular tilting and turning motions of the AR device including:

side-to-side, roll, X-axis motions;

forward and backward, pitch, Y-axis motions; and left and right, yaw, Z-axis motions.

17. The computer-implemented system of claim 13, wherein the AR device is selected from a group comprising head-worn display (HWD) systems, head-mounted display (HMD) systems, heads-up display (HUD) systems, and hand-held displays.

\* \* \* \* \*